United States Patent [19]

Pernick et al.

[11] Patent Number: 4,950,050
[45] Date of Patent: Aug. 21, 1990

[54] OPTICAL TARGET RECOGNITION SYSTEM

[75] Inventors: Benjamin J. Pernick, Hampton Bays; Suey Jue, deceased, late of Hicksille, both of N.Y., by Catharine Jue, executrix

[73] Assignee: Grumman Aerospace Corporation, Bethpage, N.Y.

[21] Appl. No.: 63,958

[22] Filed: Jun. 19, 1987

[51] Int. Cl.$^5$ .............................................. G02B 5/32
[52] U.S. Cl. .............................. 350/162.13; 350/3.73; 350/3.82
[58] Field of Search ....................... 350/162.12, 162.13, 350/162.14, 162.15, 3.73, 3.74, 3.81, 3.82

[56] References Cited

U.S. PATENT DOCUMENTS

| | | | |
|---|---|---|---|
| 2,787,188 | 4/1957 | Berger | 356/394 |
| 3,492,469 | 1/1970 | Silverman | 364/822 |
| 3,494,269 | 2/1970 | Lieser | 354/132 |
| 3,529,883 | 9/1970 | Wuerker et al. | 350/3.81 |
| 3,541,252 | 11/1970 | Collier, et al. | 358/136 |
| 3,571,603 | 3/1971 | Bryant et al. | 350/162.13 X |
| 3,603,662 | 9/1971 | Wuerker et al. | 350/3.81 |
| 3,636,330 | 1/1972 | Holeman et al. | 364/455 |
| 3,648,039 | 3/1972 | Kowalski | 364/820 |
| 3,671,106 | 6/1972 | Groh | 350/162.15 |
| 3,719,420 | 3/1973 | Krulikoski, Jr. et al. | 356/2 |
| 3,755,677 | 8/1973 | Ooue et al. | 250/204 |
| 3,779,492 | 12/1973 | Grumet | 350/3.73 X |
| 3,794,406 | 2/1974 | Kock et al. | 350/162.12 |
| 3,826,555 | 7/1974 | Matsumoto | 350/3.6 |
| 3,837,726 | 9/1974 | Suzuki et al. | 350/3.6 |
| 4,027,327 | 5/1977 | Harada | 354/201 |
| 4,156,558 | 5/1979 | Grumet | 350/320 |
| 4,206,979 | 6/1980 | Jost | 350/342 |
| 4,365,310 | 12/1982 | Green | 364/822 |
| 4,447,111 | 5/1984 | Leib | 350/320 X |
| 4,468,084 | 8/1984 | Hutcheson et al. | 350/96.11 |
| 4,490,849 | 12/1984 | Grumet et al. | 350/162.13 X |
| 4,655,548 | 4/1987 | Jue | 350/245 |

OTHER PUBLICATIONS

G. Tricoles, N. Farhat, "Microwave Holography: Applications and Techniques," Proceedings of the IEEE, vol. 65, No. 1, Jan. 1977, pp. 108–121.

J. G. Duthie, J. Upatnieks, C. R. Christensen, R. D. McKenzie, Jr., "Real–Time Optical Correlation with Solid–State Sources," Proceedings of the SPIE, vol. 231, 1980, pp. 281–290.

*Primary Examiner*—Eugene R. LaRoche
*Assistant Examiner*—Martin Lerner
*Attorney, Agent, or Firm*—Pollock, VandeSande & Priddy

[57] ABSTRACT

Prior art optical image correlators are extremely cumbersome and do not use spatial light modulators. To determine whether an of-interest target is within a scene, the present invention optical correlator uses a laser diode, a spatial light modulator, a holographic lens array, a matched filter array and an inverse transform lens. In particular, the laser diode generates a coherent laser beam, which is expanded and collimated. Information of the of-interest target is encoded thereon by the spatial light modulator. The encoded laser beam is then directed to the holographic lens array, which replicates from the single laser beam a plurality of similar beams. These beams are focused onto a matched filter array having multiple matched filters, the number of which corresponds to the number of incoming beams. If there is a close match between an incoming beam and a corresponding matched filter, a high intensity light is emitted from that particular matched filter toward the inverse transform lens, from when the high intensity beam is focused onto a correlation plane, where the existence of of-interest targets is ascertained.

8 Claims, 3 Drawing Sheets

OPTICAL TARGET RECOGNITION SYSTEM

FIELD OF THE INVENTION

The present invention relates to optical correlators and specifically is related to an optical matched filter image correlator which can select from among a group of targets in a scene particular of-interest targets.

BACKGROUND OF THE INVENTION

There are two types of optical correlators. The first type is a one dimensional optical correlator which is used for correlating incoming signals with prestored signals. The second type of optical correlators is a two dimensional optical correlator which is used to correlate images. This two dimensional type correlator is well known and has been described, for example, as a passive navigation system in U.S. Pat. No. 3,636,330. The data input for the '330 system uses star field patterns. A second two dimensional optical correlator is described in U.S. Pat. No. 3,648,039 wherein one input image is translated or displaced with respect to a second reference photograph for stereo mapping purposes. The '039 system is the so called "image - to - image⇌ correlator. It does not use any spatial light modulator or matched filters. U.S. Pat. No. 3,494,269 describes yet another optical correlator which is used to auto or cross-correlate signals recorded on film or other appropriate media optical density variations. For the '269 system, correlation is accomplished by multiplying film records in a double-pass set up. An actual motion of at least one of the optical components is undertaken to shift or translate the projected image across the input film record. Needless to say, this is extremely cumbersome.

In the article "Real-Time Optical Correlation With Solid-State Sources⇌ by J.G. Duthie, et al., two configurations for a compact correlator system are disclosed. A reflective type of spatial light modulator is used here since the two configurations work in reflective modes.

This system has the following shortcoming. The Duthie setup, as shown in his FIGS. 8 and 9, uses one laser for each matched filter record. Thus, for a large array of spatially separated matched filters, an equal number of lasers is likewise needed. Furthermore, when the Duthie correlator is operated at wavelengths that are different from the one used to fabricate the matched filter, changes occur in the focal length of the transform lens, and also in the extent of the input diffraction pattern (transverse to the lens optic axis). Hence the input diffraction pattern is no longer in one-to-one correspondence with the stored matched filter pattern as is necessary for proper functioning of the system.

SUMMARY OF THE PRESENT INVENTION

The present invention, an optical matched filter image correlator, includes a single laser diode for generating a laser beam which is expanded and collimated, before being encoded thereon by information from an of-interest target in a particular scene. The encoding of the of-interest target information on the laser beam is done by means of a spatial light modulator for real time operation. This encoded beam is then diverted to a holographic lens array whereby a plurality of encoded beams is duplicated therefrom. The duplicated beams are then transmitted to a matched filter array which contains a plurality of matched filters, corresponding in number and spatial location to the plurality of encoded beams. The information on each beam is compared with a particular pattern recorded in the corresponding matched filter. When there is a close match between an encoded beam and a pattern, a relatively high intensity light is transmitted by the corresponding matched filter to an inverse transform lens, which projects the same to a correlation plane. When the corresponding match is poor, relatively little or no light is transmitted by the matched filter to the inverse transform lens. By observing the collection of high intensity lights on the correlation plane, the existence of of-interest targets is ascertained.

The present invention optical correlator eliminates the complexity of and the need for multiple lasers by using only one laser diode, a transmissive type spatial light modulator, a holographic lens array and a matched filter array for affecting an optical matched filter image correlator, called an Optical Target Recognition system (OTR). Since the present invention OTR uses only one laser diode in conjunction with a holographic lens array, there no longer is a need to change the input target scale with a change in wavelength, i.e., the matched filter scale, per the Duthie correlator. Moreover, since the input target scale no longer needs to be changed, the matched filter array can be fabricated at any useful wavelength. Also, the matched filter array need not be made in place in the optical system. The array can be made at another optical facility. Accordingly, a less complicated optical correlator, which does not have the shortcomings of the Duthie correlator, can be effected.

Thus, it is an object of the present invention optical target recognition system to eliminate the need for using a plurality of lasers, i.e., a laser diode array.

It is yet another objective of the present invention to effect a relatively inexpensive, uncomplicated and compact optical image correlator by incorporating in combination a spatial light modulator, a holographic lens array and a matched filter array.

The above-mentioned objectives and advantages will be more clearly understood when considered in conjunction with the accompanying drawings, in which:

DETAILED DESCRIPTION OF THE INVENTION

Figure 1:
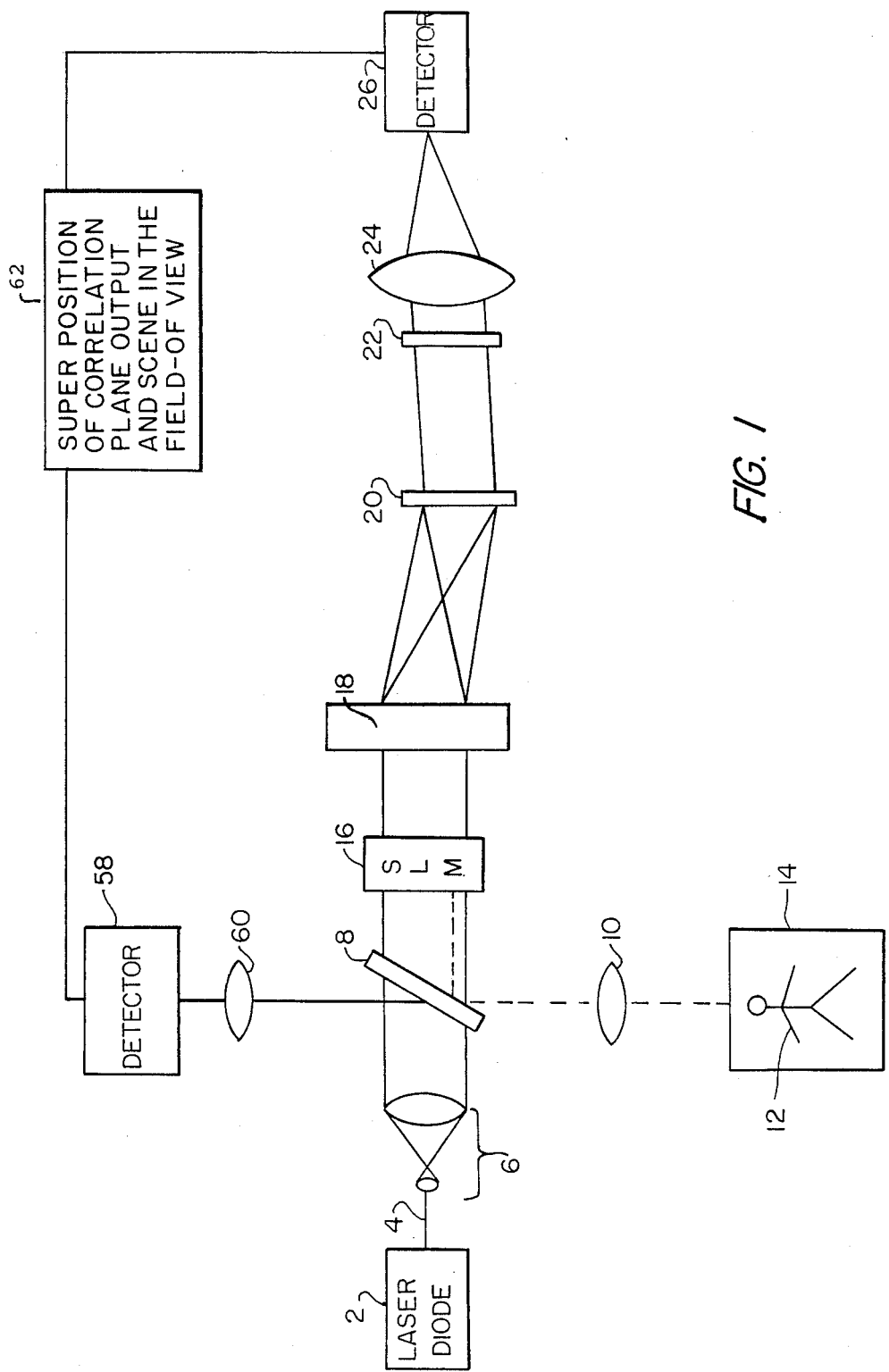
FIG. 1 is a diagrammatic view of the present invention optical target recognition system.

The present invention optical target recognition system (OTR), shown in FIG. 1, utilizes a laser diode 2 for projecting a laser beam 4 onto lenses 6. Laser diode 2 is conventional and is made by a number of companies among which includes The Hitachi Company. Lenses 6 function as a collimation lens system and is also made by a number of companies. The laser beam is expanded and collimated before being transmitted to a beam splitter 8 which also receives from a lens 10 an of-interest target 12 from a scene 14. This of-interest target, or rather the information thereof, is imaged on a transmissive type spatial light modulator 16, an embodiment of which is described in U.S. Pat. No. 4,206,979. The function of this spatial light modulator is to encode the information of the of-interest target 12 onto the coincident laser beam. This encoded laser beam is then transmitted to a holographic lens array 18, a detailed description of which is given in U.S. Pat. No. 4,447,111. Essentially, holographic lens array 18 replicates the single encoded beam transmitted thereto into a number of separate similar beams each containing the same image information. Only two are shown in FIG. 1.

These beams are next focused onto a matched filter array 20, which is described in U.S. Pat. Nos. 3,779,492; 4,156,558 and 4,490,849. The matched filter array has multiple matched filters, the number of which corresponds to the beams focused thereon. In essence, each beam from the holographic lens array is directed to a corresponding matched filter in the matched filter array. If the distribution of light striking the matched filter is very similar to the particular pattern stored in the filter, a beam of high intensity light would exit from the corresponding filter. It must be noted that each matched filter in matched filter array 20 may be different, as each matched filter may be encrypted with a different diffraction pattern related to different target features.

Any intensity light emitting from matched filter array 20 is transmitted to a polarization analyzer 22, which works in conjunction with spatial light modulator 16 to pick a particular polarization direction for generating an output light pattern. The polarization analyzer is needed to choose the polarization characteristics of the encoded laser beam which were previously altered by the spatial light modulator during encoding. Accordingly, polarization analyzer 22 may be positioned anywhere after the spatial light modulator. It is for illustration purposes only that the polarization analyzer 22 is shown to be positioned after matched filter array 20.

The high intensity light beam is focused onto an inverse transform lens 24, which is conventional and is used to focus the high intensity light beam onto a detector array 26. For this embodiment, detector 26 may be a conventional type of detector array such as a charge coupled device made by The Sony Company or other equivalent supplier. The plane upon which the high intensity light beams fall is called the correlation plane. Thus, if the of-interest target is present in the field of view 14, then a bright spot of light, (the "correlation spot"), will be detected by the detector. The location of this spot in the correlation plane is directly related to the target location in the field of view.

A bright light is an indication that an of-interest target is within scene 14. Elaborating, take for example a number of x targets and y targets. Suppose that stored within the matched filters of matched filter array 20 are patterns of different objects such as w, x, y, and z targets, etc. and that there are multiple combinations of the same. Now assume that the incoming scene contains only x targets. This scene, according to the present invention, is replicated by holographic lens array 18 into a multiple number of beams, each containing the same scene information. These encoded beams would then strike matched filter array 20 with each beam in alignment with a corresponding matched filter. Suppose that only one matched filter in the matched filter array contains a pattern (i.e., x target) corresponding to the information contained in the incoming beams. At this point, a high intensity light beam would be emitted only from that particular matched filter, which high intensity beam eventually appearing as a bright spot on detector 26. From this bright spot, one concludes that the of-interest image contains a number of x targets at specified locations in the field of view. The operator of this system can also view the target in the field of view for purposes of alignment, or confirmation. The lens 60 in conjunction with lens 10 will project an image of the scene onto a detector array 58. The detector could be, for example, a TV camera and monitor. This scene image can then be superposed or viewed simultaneously with the correlation plane light distribution using a second TV camera and video mixer circuit to combine the two TV camera signals, per block 62.

Figure 2:
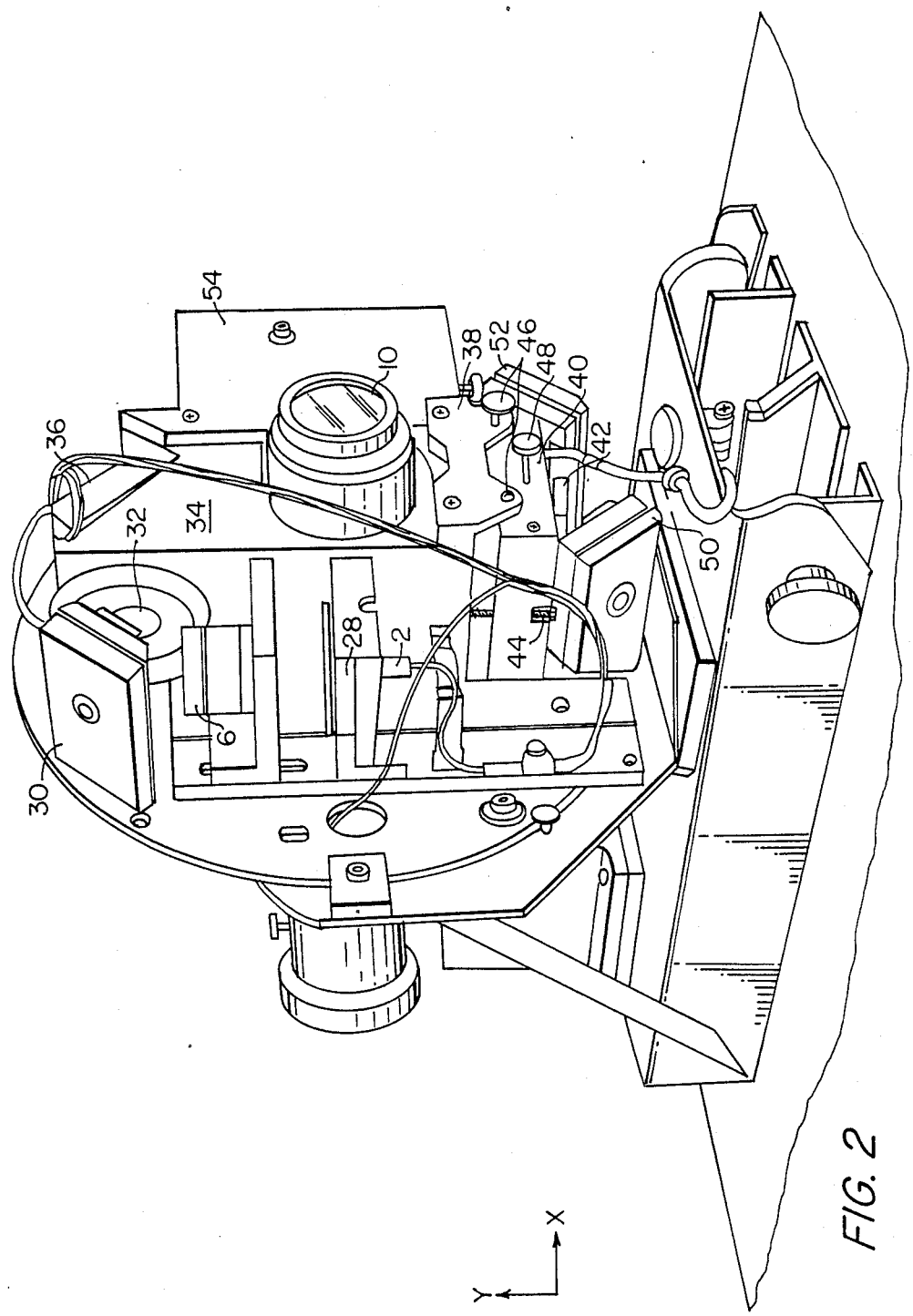
FIG. 2 illustrates a perspective view of an embodiment of the present invention.

Referring to FIG. 2, a structure illustrating the embodiment of the FIG. 1 invention is shown. To simplify matters, the same components in both FIGS. 1 and 2 (along with to be discussed FIG. 3) are similarly labeled.

Looking particularly at FIG. 2, it can be seen that a laser diode 2 is mounted in a fixture 28. This fixture, for this embodiment, has 6 degrees of freedom, i.e., three angular and three linear. A description of this mounting fixture is given in copending application Ser. No. 663,307, now U.S. Pat. No. 4,655,548 having as inventor one of the co-inventors of the present invention and assigned to the same assignee. The beam emitted from mounting fixture 28, designated 4 in FIG. 1, hits lens 6. The collimated coherent beam emitted from lens 6 is reflected by a turning mirror 30 which reflects the beam approximately 90° toward aperture 32. Mechanical controls to align and adjust the mirror are located on the mount holding mirror 30 but are not shown in the figure. Although not shown, there is a shutter working cooperatively with aperture 32 for preventing the reflected laser beam from getting into enclosure 34, if such is desired.

Before describing the components within enclosure 34, attention is directed to lens 10, which is a conventional photographic camera lens, used to focus at an image of of-interest target 12 in scene 14 (see FIG. 1). Beam splitter 8 and spatial light modulator 16 are located within enclosure 34 for receiving laser beam input from aperture 32 and the image focused from lens 10. It should be noted that there is a second mirror 36 located at the side of enclosure 34 opposed to mirror 30. Although not shown in FIG. 1, mirrors 30 and 36 would be interposed between lens 6 and beam splitter 8.

Once spatial light modulator 16 has encoded onto the laser beam the of-interest target information from scene 14, the encoded beam is directed to holographic lens array 18, stored in support fixture 40. Fixture 38 enables the adjusting of angular coordinates, i.e., the roll, pitch and yaw angles. The holographic lens array's function is to focus the encoded beam down to the matched filter array 20 contained in a second support structure within enclosure 54. Although not previously discussed, a Teflon holding clamp 42 is used to insert the holographic lens array plate into support structure 40. To provide for the yaw control, screw 44 is used in conjunction with support 38. Likewise, to adjust roll and pitch, control screw/knob 46 and knob 48 are used, respectively.

The replicated light beams from the holographic lens array, in passing through the plate held in support 40, fall on a third mirror 50 and are reflected thereby to a fourth mirror 52. These reflected beams are then directed by mirror 52 into a second enclosure 54 wherein matched filter array 20 is contained. Although not shown, the fixture within enclosure 54 is used to support the matched filter array and to control the remaining degrees of freedom, that is x, y, and z, not controlled within fixture 38 and support 40. The mirror 50 is arranged such that only light diffracted by the holographic lens 18 will reach the matched filter 20. The portion of the laser beam that is not diffracted by the hololens array 18 is not reflected by mirror 50. Instead, it is allowed to exit the system.

As was mentioned previously, the matched filter array contains a plurality of matched filters, each of which may have a distinct pattern. Each matched filter corresponds to a particular incoming beam from the holographic lens array. If there is a match between a matched filter and the information encoded in the incoming beam, a high intensity beam would output from that matched filter and impinge on inverse transform lens 24, shown in FIG. 3, which is a side view of the system shown in FIG. 2. The light beams, that is, any light beams from the matched filter array, are reflected by a mirror in enclosure 54 and are collected by inverse transform lens 24 and focused onto detector 26, which is shown as positioned behind lens 24 in FIG. 3. Next to and in front of detector 26 is an auxiliary camera 55 which would be used for the detector 58 in FIG. 1 when superposition of the scene and of the correlation plane are to be accomplished. The lens 60 is also shown in conjunction with detector 55. The electronics for controlling these components are conventional and are contained within support casing 56.

Figure 3:
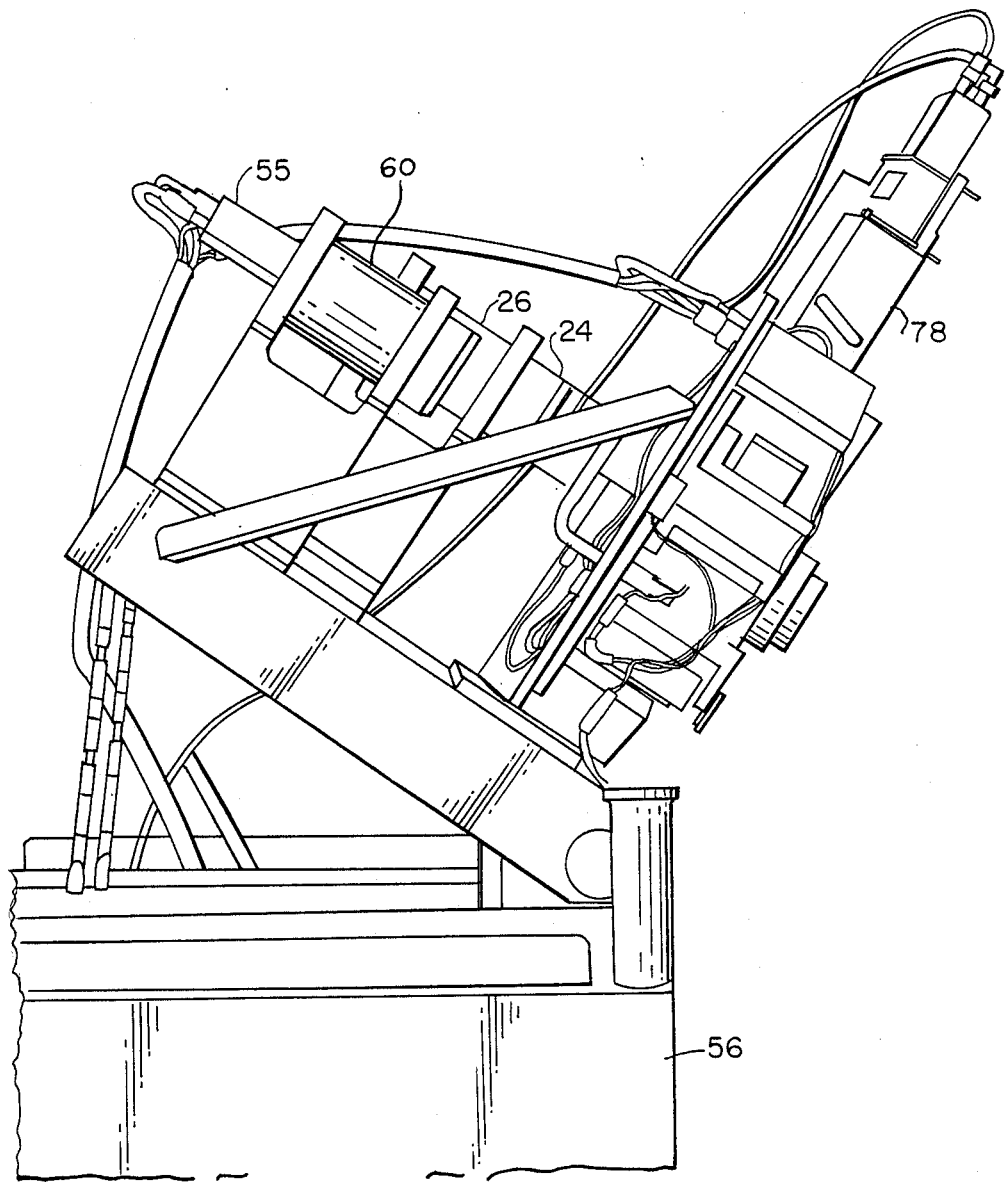
FIG. 3 is a side view of the FIG. 2 embodiment.

As shown in FIG. 3, mounted on top of enclosure 54 is a detector microscope 78 which is used to align the matched filter with the holographically formed encoded beams. This component is only used for alignment purposes and is not a functional part of the optical target recognition system (OTR). Inasmuch as the structure of the present invention illustrated in FIGS. 2 and 3 is quite compact, the present invention OTR can be fitted into typical vehicles such as an aircraft or a missile.

Although the invention has been described with reference to a preferred embodiment, it should be readily apparent that many modifications and variations are possible within the scope of the art. Thus, it is intended that all matter described throughout this specification and shown in the accompanying drawings be interpreted as illustrative and not in a limiting sense. Accordingly, it is intended that the invention be limited only by the spirit and scope of the appended claims.

What is claimed is:

1. In an apparatus for optically correlating of interest target information with predetermined patterns, the apparatus comprising:
   focus means for capturing an image of at least one of interest target;
   a laser diode fixed onto a support of a mounting means for projecting a laser beam to lens means in close relationship therewith, the mounting means providing at least six degrees of freedom, and the lens means expanding and collimating the laser beam;
   means for reflecting the expanded and collimated laser beam onto a spatial light modulator housed in a first enclosure fixedly coupled to the mounting means, the spatial light modulator encoding information representative of the of interest target onto the expanded and collimated laser beam;
   holographic lens array means, secured to a support fixture of the mounting means and positioned adjacent to the first enclosure, for replicating from the encoded expanded and collimated laser beam a plurality of similar beams;
   matched filter array means positioned within a second enclosure coupled to the first enclosure for receiving the plurality of encoded beams, the matched filter array means having a plurality of filters each for comparing a corresponding one of the encoded beams with at least one predetermined pattern to discern the presence of the of interest target;
   wherein a high intensity light is emitted from a filter if there is a match between its at least one predetermined pattern and its corresponding encoded beam to indicate the presence of the of interest target; and
   wherein the mounting means and the first and second enclosures are either directly or indirectly coupled to each other to effect a compact structure for the apparatus.

2. The apparatus of claim 1, further comprising:
   an inverse transform lens positioned adjacent to the matched filter array means;
   another reflecting means positioned within the second enclosure for directing any high intensity light emitted from any filter of the matched filter array means to the inverse transform lens;
   a detector in alignment with the inverse transform lens for accepting any high intensity light directed to the inverse transform lens and passed therethrough to determine of interest information from the of interest target.

3. The apparatus of claim 2, further comprising:
   a detector array positioned proximately to the detector for providing superposition of the scene of interest with a correlation plane light distribution of the detector.

4. The apparatus of claim 2, wherein the detector comprises a charge coupled device.

5. The apparatus of claim 1, further comprising:
   a polarization analyzer working cooperatively with the spatial light modulator to select a direction for polarization of the of interest target information.

6. The apparatus of claim 1, further comprising:
   a detector means mounted to the second enclosure for aligning the matched filter array with the encoded beams.

7. The apparatus of claim 6, wherein the detector means comprises a camera.

8. The apparatus of claim 1, further comprising:
   a beam splitter interposed between the lens means and the spatial light modulator for reflecting the image of the of interest target to the spatial light modulator.

* * * * *

UNITED STATES PATENT AND TRADEMARK OFFICE
CERTIFICATE OF CORRECTION

PATENT NO. : 4,950,050
DATED : August 21, 1990
INVENTOR(S) : Benjamin J. Pernick, et al.

It is certified that error appears in the above-identified patent and that said Letters Patent is hereby corrected as shown below:

Title page:

In the Abstract, line 19, change "when" to --whence--.

Column 1, line 24, change ""image-to-image$\leftarrow$" to --"image-to-image"--;

line 37, change "Sources$\leftarrow$" to --Sources"--.

Signed and Sealed this

Twenty-first Day of January, 1992

Attest:

HARRY F. MANBECK, JR.

Attesting Officer

Commissioner of Patents and Trademarks